United States Patent [19]

Lasnier et al.

[11] Patent Number: 5,086,807

[45] Date of Patent: Feb. 11, 1992

[54] PRESSURE REDUCER

[75] Inventors: Didier Lasnier, Cergy, France; Bruno Beaco, Verona, Italy; Daniel Sakreiter, Montgeroult par Boissy l'Aillerie, France

[73] Assignee: L'Air Liquide, Societe Anonyme pour l'Etude et l'Exploitation des Procedes Georges Claude, Paris, France

[21] Appl. No.: 651,011

[22] Filed: Feb. 5, 1991

[30] Foreign Application Priority Data

Feb. 22, 1990 [FR] France .................. 90 02199

[51] Int. Cl.⁵ .............................. G05D 16/06
[52] U.S. Cl. .......................... 137/505.11; 137/505.42; 137/557
[58] Field of Search ............. 137/505.41, 505.42, 137/505.37, 505.45, 557, 505.11

[56] References Cited

U.S. PATENT DOCUMENTS

| 527,902 | 10/1894 | Taafel | 137/505.11 |
|---|---|---|---|
| 2,666,278 | 1/1954 | Matasovic | 137/557 X |
| 2,684,838 | 7/1954 | Rush | 137/505.37 X |
| 2,887,123 | 5/1959 | Becker | 137/505.11 |
| 2,908,158 | 10/1959 | Jacobsson | 137/505.11 X |
| 3,937,243 | 2/1976 | Harkrader et al. | |

FOREIGN PATENT DOCUMENTS

| 2545612 | 4/1977 | Fed. Rep. of Germany . |
| 2101569 | 3/1972 | France . |
| 2233656 | 1/1975 | France . |

Primary Examiner—Stephen M. Hepperle
Attorney, Agent, or Firm—Young & Thompson

[57] ABSTRACT

The pressure reducer body includes oppositely disposed bores for mounting inlet and outlet connecting devices, and the outer end of another bore defining a high pressure chamber in which the regulating valve is mounted, is adapted to receive a connecting device for a high pressure manometer defining a rest for a spring of a regulating valve which includes an annular truncated lining in which is force fittingly engaged a connecting rod between the regulating valve and the piston bounding the low pressure chamber. Applications to various pressure reducer arrangements for industrial use.

10 Claims, 2 Drawing Sheets

PRESSURE REDUCER

BACKGROUND OF INVENTION (a) Field of the Invention

The present invention relates to industrial type pressure reducers, comprising, in a body, a regulating valve which is axially movable in a first bore and is acted upon by means of a first spring to cooperate with a seat between a high pressure chamber and a low pressure chamber, and connected to an axially movable partition, defining the low pressure chamber on one side thereof and acted upon by means of a manually adjustable second spring in a direction inducing the valve to be removed from its seat, an inlet duct for introducing high pressure gas into the high pressure chamber, a low pressure gas outlet duct connected to the low pressure chamber, and means for mounting at least one manometer on the body, in communication with the high pressure chamber.

(b) Description of Prior Art

In known pressure reducers of this type, the body of the pressure reducer is formed with a large number of bores, namely a mean diameter bore constituting a seat for the regulating valve, a large diameter bore constituting the low pressure bore, a small diameter bore, which is coaxial with the previous bores, defining a connection between the high pressure and low pressure chambers, two bores for the inlet duct, two bores for the outlet duct, as well as two additional bores for mounting a high pressure manometer and a low pressure manometer, and still an additional bore for mounting an overpressure valve which communicates with the high pressure chamber. On the other hand, the mean diameter bore receiving the regulating valve is closed by means of a plug constituting a rest for the first spring acting on the valve in an arrangement which does not enable to guarantee that operators can act on the regulating valve, no more on the other hand than on the overpressure valve.

OBJECT OF THE INVENTION

It is an object of the present invention to propose a new industrial type pressure reducer of highly simplified design, which limits the number of machining operations to thereby facilitate an automated production in bulk and at lower cost, guarantees an increased reliability and safety, and integrates the notion of modularity enabling a high flexibility of use for different types of pressure reducers depending on their environment and permitting a manufacture according to the concept of "just in time".

SUMMARY OF INVENTION

To achieve this, according to a characteristic of the invention, the outer extremity of the first bore is shaped to receive a first manometer connecting means for axially mounting the manometer and constituting a rest for the spring acting on the regulating valve.

According to another characteristic of the invention, a second and a third bore are coaxially formed in the body, at right angle to the axis, and are intended to receive an inlet connecting means and an outlet connecting means defining a portion of the inlet duct and a portion of the outlet duct, respectively.

According to yet another characteristic of the invention, the movable partition comprises a piston slidably mounted in a fourth large diameter bore of the body, the valve adjusted for overpressure being advantageously mounted in a tubular hub part of the piston defining a seat for the overpressure valve.

BRIEF DESCRIPTION OF THE DRAWINGS

Other characteristics and advantages of the present invention will appear from the description which follows of an embodiment given only by way of illustration but without any intention to limit the scope of the invention, in association with the annexed drawings in which.

DETAILED DESCRIPTION OF THE INVENTION

Figure 1:
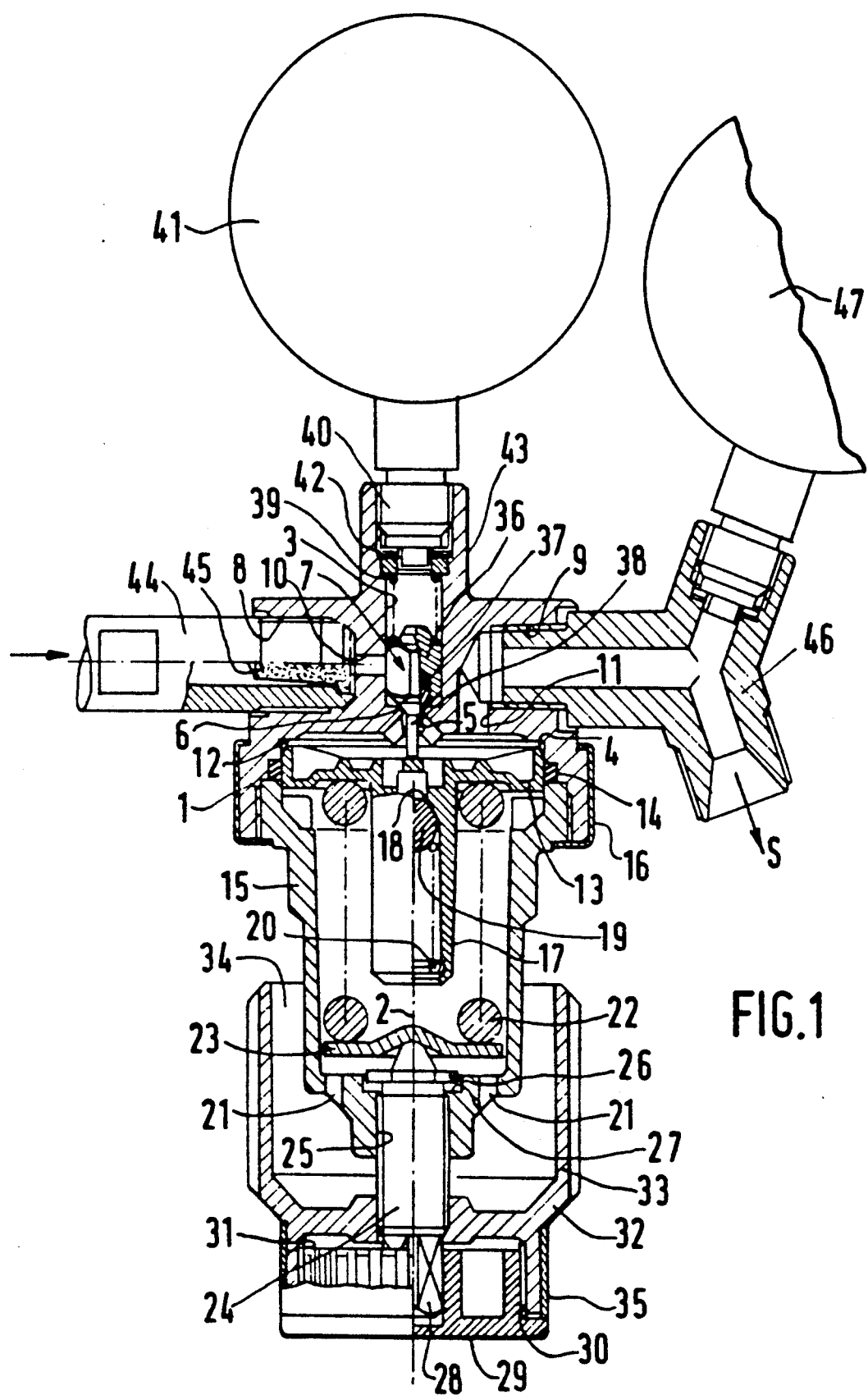
FIG. 1 is a schematic cross-section view of a pressure reducer according to the invention in the embodiment comprising a pressure reducer with two manometers.

As illustrated in FIG. 1, the pressure reducer comprises a body (1) typically made of light cast alloy including along a main axis (2), three coaxial bores, namely a mean diameter bore (3) opening towards the top of the body, a large diameter bore (4) opening towards the bottom of the body and a stepped bore of small diameter (5) establishing a connection between the bores (3) and (4) and forming, at its upper part, a seat (6) for a valve body (7) slidably mounted in bore (3).

In the body (1) there are oppositely provided, coaxially with one another and at right angle to the main axis (2), two bores (8) and (9) respectively communicating via a small transverse bore (10) and via an axial bore (11), with bore (3) and the upper part constituting a low pressure chamber (12) of bore (4). A piston (13) is slidably mounted in bore (4), the piston being of a light alloy or of a plastic material with high mechanical properties, for example of polyamide, which is sealed with an O ring (14) carried by body (1) and blocked into position by means of a bell shaped cover (15) covering the piston (13) and mounted on the body (1). A ring (16) is crimped around body (1) and cover (15) to preserve the connection between the body (1) and the cover (15). Piston (13) includes a tubular hub part (17) downwardly extending to define an interior housing which communicates with the low pressure chamber (12) by means of a duct constituting a seat (18) for a ball valve (19) which is held against seat (18) by means of a spring (20) resting on a ring mounted at the lower end of the hub part (17), this assembly constituting an overpressure or safety valve between the low pressure chamber (12) and the atmosphere via ducts (21) formed in the head of the cover (15).

Piston (13) acts in a direction which has a tendency to reduce the volume of the low pressure chamber (12) by means of a strong spring (22) located in the cover (15) and resting on a plate (23) articulately carried at the inner end of an adjusting screw (24) cooperating with an adjustment nut (25) formed in the head of the cover (15). The inner end of the screw (24) includes a collar (26) capable of cooperating with an inner shoulder (27) formed in the head of the cover (15) so as to prevent any escape of screw (24) towards the outside. The outer end (28) of the screw (24) comprises corners for force fittingly mounting same in a central bore of a plug (29), typically made of high density plastic material including an externally toothed crown (30) intended to cooperate by indexation fitting with an internally toothed crown (31) of an annular plug (32) constituting a device for manually adjusting the force of the spring (32) and including an upwardly extending skirt (33) partially surrounding the cover (15) and forming an upwardly projecting annular duct (34), according to the norms in force, the gas which escapes through ducts (21) when the overpressure valve (19) is opened limiting the pressure and the low pressure chamber (12). A marking ring (35) is mounted around the lower part of the plug (32).

According to an aspect of the invention, the regulating valve (7) includes a valve body with flat faces (36) slidably mounted for tight fitting in bore (3) and including, in its lower part, a stepped housing in which there is mounted an annular lining (37) of polymer material which is compatible with the moving gases, an axial rod (38) being force fittingly engaged in the annular lining to constitute a mechanical bond between the valve body (7) and the piston (13). The truncated shape of the lining (37) ensures a better seal in association with the seat (6) and eliminates the tendency to have undesirable particles or shapes to become stuck at the level of the seat (6). The mounting by fitting of the rod (38) in the lining (37) ensures a perfect positioning and joining of the lining in the valve body (7). The valve body (6) is pushed towards the seat (6) by means of a spring (39).

According to a particular aspect of the invention, the upper end of the bore (3) is shaped so as to receive a means (40) for connecting a high pressure manometer (41) thus axially mounted in the pressure reducer. The connecting means (40) cooperates, via a sealing and positioning ring (42) with a metallic ring (43) having a filter forming central orifice, permanently mounted in bore (3) and thus constituting an abutment not only for the connecting means (40) of the manometer (41) but also for the spring (39) acting on the valve body (7).

According to an advantageous aspect of the invention, the opposite arrangement of the bores (8) (9), which can be simply and very rapidly produced by automated production means enables to add to the pressure reducer a plurality of inlet connecting means (44) establishing communication with the high pressure chamber constituted by bore (3), and outlet connecting means (46) enabling the downstream connection of the pressure reducer with a circuit or other components of the low pressure circuit. Typically, the inlet connecting means (44) is provided with an integrated filter (45), which dispenses with providing means for mounting such a filter in the body of the pressure reducer per se. In the example illustrated in FIG. 1, the outlet connecting means (46) is of the Y type enabling a connection to an outlet circuits, as illustrated in FIG. 1, and the mounting, outside body (1), of a low pressure manometer (47).

Figure 2:
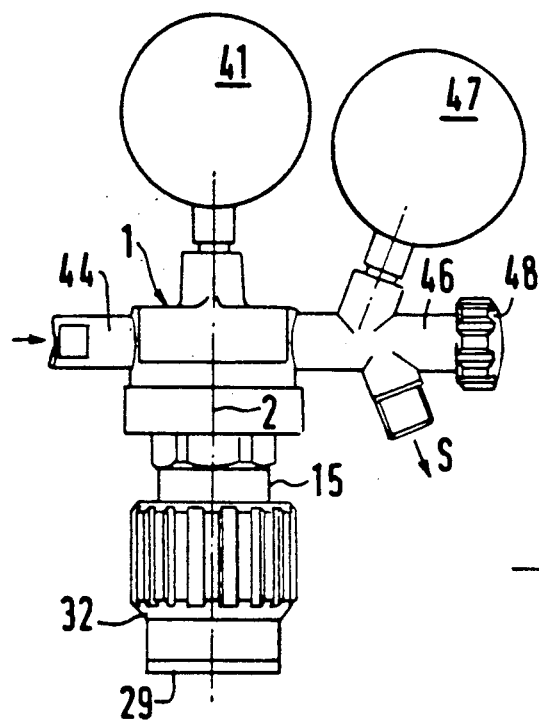
FIGS. 2 to 4 represent, by way of illustration, other embodiments of pressure reducers illustrating the modular character of the pressure reducer according to the invention.
Figure 3:
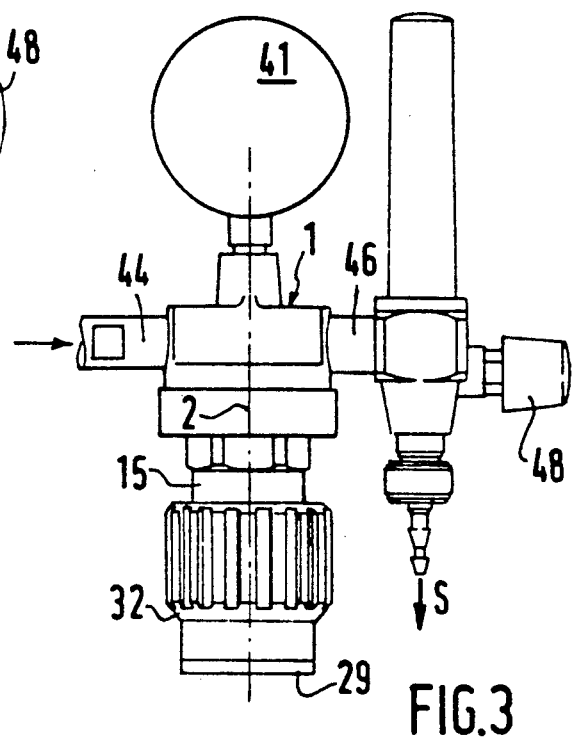
Figure 4:
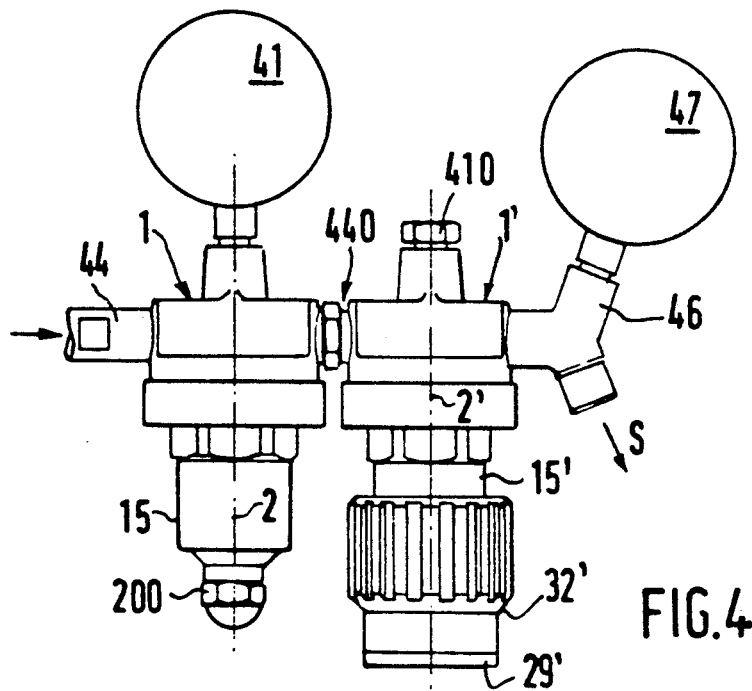

The modular adaptation of the pressure reducer according to the invention is clearly shown by the variants schematically represented in FIGS. 2 to 4 which represent, respectively:

FIG. 2, a pressure reducer with a double manometer of the type previously described, with additionally, axially mounted in the outlet connection (46), a manual faucet (48) to modulate or interrupt the downstream gas flow (S).

FIG. 3 a pressure reducer of the so-called flowliter type; and

FIG. 4, a double expansion pressure reducer utilising in series two pressure reducers of the type described previously, the high pressure manometer (41) being mounted on the first pressure reducer body (1) including a simple plug (200), the low pressure manometer (47) being mounted on the outlet connecting means (46) placed on the second pressure reducer body (1') where the low pressure manometer is here replaced by a simple plug (410), a connection between the two pressure reducer bodies (1) and (1') being ensured by a double thread connection (440) simultaneously constituting an outlet connecting means of the first body (1) and an inlet connecting means in the second pressure reducer body (1').

Even though the present invention has been described with respect to specific embodiments, it is not limited thereby, but, on the contrary, it can be modified and variants will appear possible to anyone skilled in the art.

We claim:

1. A pressure regulating valve comprising a valve body having an axis and defining internally a high-pressure chamber and a low-pressure chamber separated by a valve seat coaxial with said axis, a valve member displaceable along said axis for engagement with the valve seat, the valve member being biased by a valve spring toward the valve seat and operatively coupled to a piston means movable in the low-pressure chamber along said axis, a manually adjustable spring biasing means biasing said piston means in a direction opposite the biasing direction of the valve spring, the valve body including inlet passage means communicating with the high-pressure chamber, outlet passage means communicating with the low-pressure chamber and a first bore coaxial with said axis within which is slidingly received said valve member, said first bore opening outwardly and having an outer end portion adapted to receive mounting means for mounting a high-pressure manometer on the valve body and forming a rest for said valve spring.

2. The valve of claim 1, comprising a second bore and a third bore formed coaxially in the valve body, at a right angle to said axis and opening outwardly in opposite directions, said second and third bores communicating respectively with the high-pressure and with the low-pressure chambers and being adapted to receive an inlet connecting means and an outlet connecting means, respectively.

3. The valve of claim 2, wherein the outlet connecting means is a branched connection member comprising an outlet port and means for mounting a low-pressure manometer.

4. The valve of claim 1, wherein the valve member has, at one end, a conical lining for cooperation with the valve seat and within which is fitted a coupling rod extending through the valve seat for cooperation with the piston means.

5. The valve of claim 4, wherein the valve member is formed peripherally with flat faces for guided sliding in the first bore.

6. The valve of claim 1, wherein the piston means comprises a piston member slidingly received in a fourth bore coaxial with the axis and defining part of the low-pressure chamber.

7. The valve of claim 6, wherein the piston member includes a relief valve responsive to an overpressure in the low-pressure chamber.

8. The valve of claim 1, wherein the manually adjustable spring biasing means comprises a spring housed in a housing member secured coaxially to the valve body, and a screw for adjusting the force of the spring, screwed in an end portion of the housing member and having an outer end shaped for force-fittingly receiving a handling means.

9. The valve of claim 8, wherein the handling means includes a tubular handle portion partially surrounding the housing member and formed with an inner toothed crown, and a central hub portion for coupling to the outer end of the screw and formed with an outer toothed crown for indexation mounting within the handle portion.

10. A pressure regulating valve comprising a valve body having a first axis and formed internally with outwardly opening first and second bores coaxial with the first axis and separated by a valve seat, and with outwardly opening third and fourth bores coaxial with a second axis orthogonal to said first axis and in fluid communication with the first and second bores respectively, a valve member slidingly received in the first bore for engagement with the valve seat and biased toward the valve seat by a first spring, a piston means movable in the second bore, carrying a relief valve and mechanically coupled to the valve member through said seat and biased in the direction toward the valve member by a second spring, manually actuatable adjusting means secured to the body coaxially with the first axis for adjusting the force of the second spring, mounting means in the first bore for mounting a high-pressure manometer on the body, and connection means in the third and fourth bores for connection to a fluid distribution line.

* * * * *